July 10, 1962 J. A. HOUBEN ETAL 3,043,722
METHODS AND JIGS FOR ALLOYING AN ELECTRODE
TO A SEMI-CONDUCTIVE BODY
Filed Sept. 12, 1960 2 Sheets-Sheet 1

INVENTORS
Jan A. Houben
Johannes G. J. van Heyl
Nico B. Speyer
BY
Frank R. Trifari
AGENT July 10, 1962 J. A. HOUBEN ETAL 3,043,722
METHODS AND JIGS FOR ALLOYING AN ELECTRODE
TO A SEMI-CONDUCTIVE BODY
Filed Sept. 12, 1960 2 Sheets-Sheet 2

INVENTORS
Jan A. Houben
Johannes G. J. van Geyl
Nico B. Speyer
BY
Frank R. Trifari
AGENT

United States Patent Office 3,043,722
Patented July 10, 1962

3,043,722
METHODS AND JIGS FOR ALLOYING AN ELECTRODE TO A SEMICONDUCTIVE BODY
Jan Antonius Houben, Johannes Gerardus Josephus van Meyl, and Nico Bram Speyer, all of Nijmegen, Netherlands, assignors to North American Philips Company, Inc., New York, N.Y., a corporation of Delaware
Filed Sept. 12, 1960, Ser. No. 55,261
Claims priority, application Netherlands Sept. 12, 1959
10 Claims. (Cl. 117—213)

The invention relates to a method and jig for alloying an electrode onto a semi-conductive body, which body may be employed in a semi-conductive device, for example, a transistor or a crystal diode.

It is common practice to alloy such electrodes by contacting a quantity of electrode material with the semi-conductive body and by heating both at a temperature which is sufficiently high for a small quantity of the semi-conductive material to dissolve in the electrode material; during the subsequent cooling the semi-conductive material crystallizes out and grows usually on the initial crystal lattice of the body. The nature of the electrode material is usually such that the electrical properties of the crystallized material differ from those of the initial semiconductive material.

During this alloying process the electrode and also the crystallized material penetrate to some extent into the semi-conductive body. For many uses it is desirable that the penetration depth should be constant as far as possible throughout the area of the electrode.

It is known that it is desirable to this end to remove previously and carefully surface impurities from the semi-conductive body.

It is furthermore known that a uniform penetration depth of the electrode can be obtained by heating separately the quantity of electrode material and the semi-conductive body and by causing them subsequently to contact abruptly with each other, for example, by causing the material to drop onto the body, so that the whole zone of the electrode is at once covered. Heating takes place, as a matter of course, in an inert or a reducing atmosphere.

Although this method yields satisfactory results for comparatively small zones or small area electrodes, it does not suffice for larger zones. If larger electrode zones are to be covered it is necessary to throw such a large quantity of electrode material onto the body that also a large quantity of semi-conductive material is dissolved, so that a great penetration depth is involved. Such a great penetration depth gives rise to differences in depth, of which the absolute value is high.

It is particularly difficult to form electrode zones in this manner, of which the length is great with respect to the width, i.e. line- and ring-shaped zones. Particularly in these cases it appears that great differences in penetration depth are produced.

The invention, which relates to a method of alloying an electrode onto a semi-conductive body, in which a quantity of electrode material and the body are separately heated and then caused to contact with each other abruptly, has for its object, inter alia, to obviate these disadvantages.

In accordance with the invention, the alloying process takes place in a jig, in which the semi-conductive body is initially located above the electrode material, which material is supported by a weight displaceable or movable in the jig, the jig being subsequently turned over so that the electrode material drops onto the body and the weight onto the electrode material.

The displacement of the weight is preferably guided by wall portions of the jig in a direction at right angles to the plane of the semi-conductive body, on which the electrode is to be provided.

The weight may have an annular sectional area and the jig is provided with an annular slot, in which the weight is displaceable.

At least the side of the weight in contact with the electrode material consists preferably of a substance which is inactive or inert relative to the said material.

The weight portion remote from the electrode material may consist of a material which is liquid during the alloying process, for example lead.

The invention furthermore relates to the jig to be used in the methods described above, which jig has at least one tubular channel having a locating area orientated transversely to the channel intended for a semi-conductive body and having a weight which is displaceable in this channel with a small amount of play or clearance.

The invention and a few embodiments thereof will now be described more fully with reference to a number of examples, illustrated in the accompanying drawing, in which.

Figure 1:
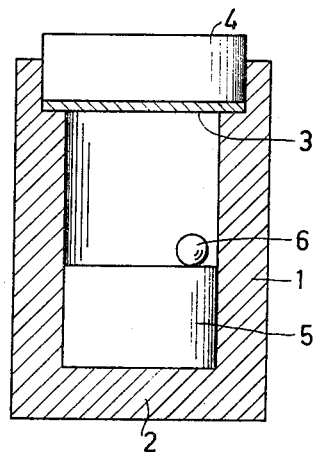
FIGS. 1 and 2 are sectional views of a jig to be used for alloying circular electrodes, i.e. in the stage prior to alloying and in the stage after it.
Figure 2:
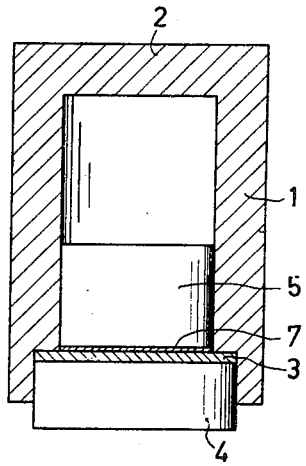

The jig shown in FIGS. 1 and 2 consists of a cylindrical tubular piece 1, which is closed at one end by a bottom 2. In the open end provision is made of a locating or receiving area for a semi-conductive body 3, for example a germanium or silicon monocrystal disc, covered by a plug 4. In the tubular piece is displaceable, with a small amount of play, a cylindrical weight 5. The tubular piece 1 and the plug 4 are held together by a clamp or holder (not shown). These parts may be made from a material conventionally used for the manufacture of jigs for alloying electrodes, for example, graphite, superficially oxidized ferrochromium or ceramic material. The weight 5 may be made of the same material; the use of a metal, for example, Nichrome is preferred, since this has a higher specific weight than graphite or ceramic material. At least the portion of the weight which enters into contact with the electrode material is preferably of a material which does not adhere thereto and which is inert relative thereto. The weight of course depends upon the size of the alloying area. In a typical example, for a semiconductor disc of 15 mms. in diameter, and 50 microns thick, with a pellet having a weight of 0.5 grs., to produce a 75 square millimeter junction, the weight was 5 grams and fell a distance of 7 mms. The falling distance is not critical, but preferably is at least 5 mms.

In order to alloy with the aid of this jig, the parts are assembled in the manner shown in FIG. 1 after a quantity of electrode material 6, for example in the form of a pellet, has been put on the weight 5. The assembly is then heated in a furnace in hydrogen, to which may be added, if desired, a trace of hydrochloric acid gas, at 520° C. for 30 minutes, for instance. Then the jig is turned over into the position shown in FIG. 2. The electrode material thus drops on the semi-conductive disc and is immediately thereafter distributed by the following weight 5 throughout the surface of the body to form a thin layer 7.

After cooling the plug 4 and the disc 3 are removed out of the jig.

In a similar manner electrodes of indium or tin were alloyed onto a disc of silicon. The jig was heated at 1000° C. in a hydrogen atmosphere. After a satisfactorily adhering layer with a uniform penetration depth had thus been obtained, a small quantity of aluminum was added to the electrode by painting on such electrode a dispersion of aluminum in lacquer and heating under the same conditions, so that a strongly doped, segregated p-type layer was obtained.

Figure 3:
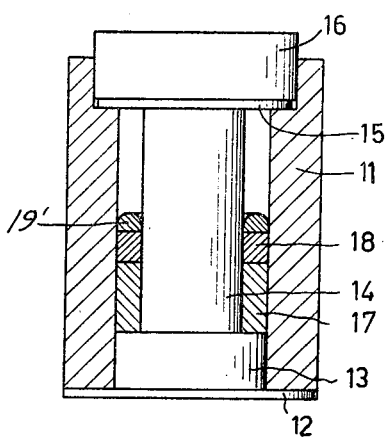
FIGS. 3 and 4 are sectional views of a jig for alloying annular electrodes, also in two stages.
Figure 4:
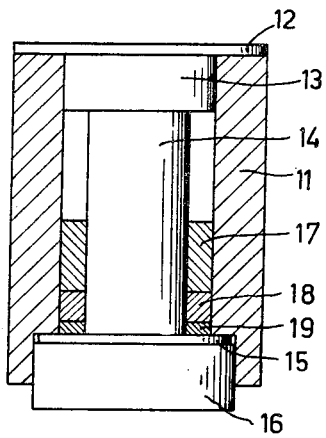

The jig shown in FIGS. 3 and 4 is intended for the application of annular electrodes, to which end the method according to the invention is also very suitable. This jig consists of a cylindrical tube 11 with a core consisting of a plate 12, a disc 13 and a rod 14, which parts are integral with each other. This core is introduced into the tubular piece 11 from one end. The other end has a locating area for a semi-conductive body 15 and a plug 16. The various parts are again held together by a clamp (not shown).

Between the core 14 and the inner wall of the tubular piece is formed an annular slot which determines the shape of the electrode to be alloyed onto the semi-conductive body. In this slot are displaceable a ring 17 of nichrome and a ring 18 of graphite. These parts constitute together the weight.

The electrode material 19' is put on the graphite ring, for example, in the form of an annularly curved indium wire. In the manner described in the first example this material is fused, after which the jig is turned over into the position shown in FIG. 4. The electrode material is thus cast into a thin, annular layer 19.

Figure 5:
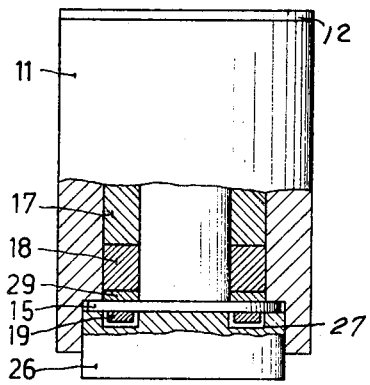
FIG. 5 is a sectional view of this jig intended for the application of a second annular electrode.

After the assembly has cooled, a similar annular electrode may be provided on the other side of the semi-conductive body 15 by means of a similar alloying jig (see FIG. 5), in which, however, use is made of a plug 26, which is provided with a groove 27, in which the electrode 19 fits accurately. In FIG. 5 a certain space is left, for the sake of clarity, between the groove 27 and the electrode 19.

If in the manner corresponding to the application of the electrode 19, a second annular electrode 29 is alloyed onto the top side of the body 15, the groove 27 prevents the electrode 19 from flowing out beyond its initial boundaries.

Figure 6:
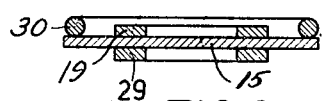
FIGS. 6 and 7 are a sectional view and a plan view of a transistor to be manufactured by means of the jig shown in FIGS. 3 to 5, with annular electrodes.
Figure 7:
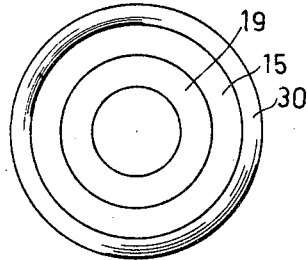

FIG. 6 shows, in a sectional view, the semi-conductive device obtained and FIG. 7 is a plan view thereof. Reference numeral 30 designates a third electrode, which consists, for example, of an annular wire soldered to the disc 15.

If two or more electrodes are alloyed not simultaneously but one after the other onto a semi-conductive body, it must always be considered to what extent the electrode or electrodes already alloyed are affected by the alloying of subsequent electrodes. In this respect it should be noted that, when an electrode, such as the electrode 19, has once been formed, its penetration depth being uniform throughout the zone, this uniformity will not be markedly affected by a second heating process beyond the melting point. It is, of course, desirable to prevent the plug 26 from exerting a pressure on an alloyed electrode, after the plate 15 has been turned over in the jig.

Figure 8:
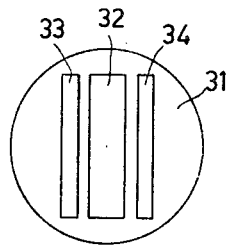
FIG. 8 is a plan view of a transistor with linear electrodes.
Figure 9:
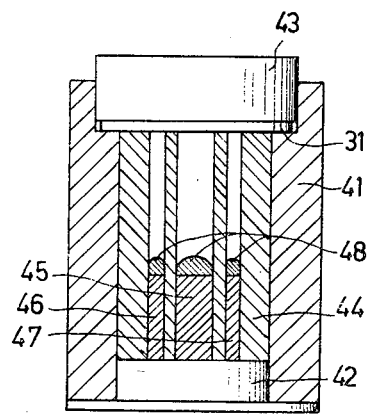
FIG. 9 is a sectional view of a jig intended for the manufacture of a transistor as shown in FIG. 8.

The method according to the invention is also useful for the application of line-shaped electrodes; an example thereof is shown in FIG. 8. This figure shows the top side of a transistor consisting of a semi-conductive disc 31 with an emitter 32 and two base connections 33 and 34 to be connected in parallel. The collector, provided on the rear side, is not shown. For alloying these electrodes use may be made of the jig shown in FIG. 9.

This jig consists of a tubular part 41, which is closed at the bottom by a lid 42. On the top side is provided a locating area for the semi-conductive body 31, this area being covered by a plug 43. In the tubular piece 14 is furthermore provided a core 44, in which three channels with a rectangular profile are recessed. This profile corresponds to the shape of the electrodes 32 to 34. In the channels three weights 45 to 47 are displaceable with a small amount of play; they may be made of ferrochromium and are coated on top with graphite (the graphite layer is not shown). On each weight is provided a quantity of electrode material 48.

In the manner as described for the jigs shown in FIGS. 1 and 2 this jig is also turned over, after the material has been melted, so that the three electrodes are formed.

When carrying out the method according to the invention it appeared to be advantageous to make part of the weight from a metal, for example, lead, which is in the molten state during the turn-over of the jig. Thus the friction during the displacement of the weight is reduced and a uniform pressure is better ensured.

Figure 10:
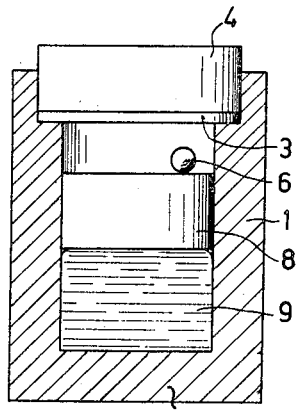
FIG. 10 is a sectional view of a jig, in which part of the weight is formed by a fluid.

FIG. 10 shows the same jig as FIG. 1, but the weight 5 is replaced by a part 8, consisting for example of graphite and a part 9 consisting of lead, which is liquid during the alloying process proper.

The composition of the semi-conductive body and of the electrode material to be fused is not essential for the invention. The method may be used for the application of electrodes to germanium, silicon and other semi-conductive elements and to semi-conductive compounds.

What is claimed is:

1. A method of making a surface-alloyed electrode to a semiconductive body, comprising separately heating the said body and a mass of electrode-forming material in spaced apart relationship at a temperature at which the mass become molten, thereafter bringing the molten mass and body into abrupt contact with one another and dropping a weight on the contacting mass and body to cause the latter uniformly and intimately to contact one another, and cooling the mass and body to form an electrode alloyed to the body.

2. A method of making a surface-alloyed electrode to a semiconductive body, comprising providing within an upper portion of a jig a semiconductive body so that its bottom surface is exposed to a descending internal passageway at the bottom of which rests a movable weight movable within the passageway, placing on top of the weight a mass of electrode-forming material, heating the said body and mass in their spaced apart relationship at a temperature at which the mass become molten, thereafter inverting the jig dropping the molten mass abruptly onto the body and dropping the weight onto the molten mass to cause the latter uniformly and intimately to contact the body, and cooling the mass and body to form an electrode alloyed to the body.

3. A method as set forth in claim 2, wherein an amount of the electrode-forming material is provided such that it forms a thin, large-area mass in contact with the body.

4. An alloying jig for making a surface-alloyed electrode to a semiconductive body, comprising a hollow member having an internal passageway and at one end a receiving area for receiving and supporting a semiconductive body with its surface exposed to and communicating with the passageway, and a movable weight arranged in the passageway for movement from a first position spaced from the said receiving area through the passageway to a second position adjacent the said receiving area.

5. An alloying jig as set forth in claim 4 wherein the walls of the internal passageway extend substantially at right angles to the exposed surface of the body and function to guide the weight in its movement from the first to the second positions.

6. An alloying jig as set forth in claim 5 wherein the passageway and the weight are both annular.

7. An alloying jig for making a surface-alloyed electrode to a semiconductive body, comprising a hollow member having a generally tubular internal passageway and at one end a receiving area for receiving and holding a semiconductive body with its surface exposed to and communicating with and substantially transverse to the passageway, and a movable weight arranged in the passageway with small clearance for movement from a first position spaced from the said receiving area through the passageway to a second position adjacent the said receiving area, said weight being adapted to move from the first to the second positions when the jig is inverted.

8. An alloying jig as set forth in claim 7 wherein the portion of the weight facing the said receiving area is of a relatively inert material.

9. An alloying jig as set forth in claim 7 wherein the portion of the weight remote from the said receiving area is of a relatively low melting point material and adapted to become molten during the process of making the surface-alloyed electrode, the portion of the weight facing the said receiving area being of a material which enables it to remain solid during the said process.

10. An alloying jig as set forth in claim 9 wherein the low melting point material is lead.

References Cited in the file of this patent
UNITED STATES PATENTS
2,857,296   Farris _____ Oct. 21, 1958